United States Patent
Cheng

(10) Patent No.: US 6,374,954 B1
(45) Date of Patent: Apr. 23, 2002

(54) BABY WALKER SPEED CONTROL CASTER

(75) Inventor: Chih-ching Cheng, Hsin Chu County (TW)

(73) Assignee: Kingstar Baby Carriages Co., Ltd., Taiwan ( * ) Notice: Subject to any disclaimer, the term of this patent is extended or adjusted under 35 U.S.C. 154(b) by 0 days.

(21) Appl. No.: 09/736,203

(22) Filed: Dec. 15, 2000

(51) Int. Cl.[7] ............................................... B60B 33/00
(52) U.S. Cl. ..................... 188/1.12; 188/20; 188/82.84
(58) Field of Search .......................... 188/1.12, 19, 20, 188/82.84, 83, 180, 181 R; 280/87.051; 16/35 R

(56) References Cited

U.S. PATENT DOCUMENTS

| | | | | |
|---|---|---|---|---|
| 2,960,717 A | * | 11/1960 | Moore | 16/21 |
| 3,623,575 A | * | 11/1971 | Schiltigheim | 188/31 |
| 4,603,871 A | * | 8/1986 | McNeill | 280/33.99 |
| 5,465,986 A | * | 11/1995 | MacPae | 280/33.994 |
| 5,785,154 A | * | 7/1998 | Chen | 188/1.12 |
| 6,070,701 A | * | 6/2000 | Hu | 188/1.12 |
| 6,076,839 A | * | 6/2000 | Pao-Hung | 280/87.051 |
| 6,142,261 A | * | 11/2000 | Yang | 188/20 |

FOREIGN PATENT DOCUMENTS

| | | | |
|---|---|---|---|
| EP | 0354827 | * | 2/1990 |
| JP | 2-248726 | * | 10/1990 |

* cited by examiner

Primary Examiner—Christopher P. Schwartz
Assistant Examiner—Bradley King

(57) ABSTRACT

A baby walker speed control caster. The speed control caster includes an axle piece, a pair of wheels symmetrically provided at either side of the axle piece, and a ball. The axle piece is provided with a pivot hole, a through hole, and a pivot shaft. Each wheel is formed in a thickness radially increasing respectively from the adjacency of the wheel center and is provided with a pivot hole at the center and a plurality of embossing curves at the inner side; in this way, the wheels are pivotably connected to each other by a pivot axle passing through the pivot holes of the wheels and the axle piece sandwiched between the wheels such that a chamber, containing the ball, is formed by the through hole of the axle piece and the inner walls of the wheels and the width between two inner walls increases radially from the adjacency of the wheel center. As the baby walker moves faster, the ball is squeezed between two inner walls of the wheels when the ball is swept toward the far side of the chamber by the embossing curves, thus producing a remarkable brake effect due to the friction between the axle piece and the wheels via the ball.

4 Claims, 5 Drawing Sheets

BABY WALKER SPEED CONTROL CASTER

BACKGROUND OF THE INVENTION

A. Field of the Invention

The present invention relates to a baby walker, particularly to a baby walker speed control caster for a safety concern.

B. Description of the Related Art

The baby walker is commonly used for babies learning to walk. However, most of the conventional baby walkers do not perform a self-braking effect, hence putting the baby in danger when the speed of the baby walker goes too high especially on a downhill or an uneven roadway. Generally, the self-braking device for a baby walker can be realized as the speed control caster.

Referring to FIGS. 1 and 2, a conventional speed control caster 40 for the baby walker generally includes a wheel 41, a ring groove 42 provided at one flank of the wheel 41 and formed with a wavy ball trough 421, a fixing piece 43, a ball 44, a convex shaft tube 45 having a through hole 451 and being integrally formed together with the ring groove 42 at the interior of the caster, and a shaft rod 46.

As shown in FIGS. 1 and 2, the fixing pieces 43 is provided with a central through hole 431 for loosely pivoting with the convex shaft tube 45 such that the fixing pieces 43 is put into the ring groove 42. The shaft rod 46, being formed with a rivet-shaped end 461, is fastened to the pivot holes 401 and 402 of the wheel seat 30 respectively by passing through the through hole 431 and 451 such that the wheel 41 runs by pivoting on the shaft rod 46. Referring to FIG. 2, the ball tough 421 is shaped into three kinds of arcs which are arc 432, protruding arc 433, and concave arc 434 respectively. When the wheel 40 revolves, the ball 44 is pushed forward by the wavy contour of the ball trough 421 such that the ball 44 rolling back and forth a long the ball trough 421 is squeezed between the ring groove 42 and the protruding arc 433 as the ball 44 is swung toward the concave arc 434. As the speed of the caster 40 becomes higher, the frictional force caused between the protruding arc 433 and the ring groove 42 by squeezing the ball 44 gets larger as to result in a braking effect.

The conventional speed control caster 40 is disadvantaged for the following:

1. The frictional force caused between the protruding arc 433 and the ring groove 42 can hardly afford an obvious braking effect for a speed control caster.
2. The protruding arc 433 tends to be deformed after the speed control caster is used for a period of time.
3. The fixing piece 43 does not revolve as the wheel 41 but swing about the convex shaft tube 45, thus hindering the wheel agility at a relatively low speed.
4. The conventional speed control caster has a complex structure resulting in a high-level damage rate and a high manufacturing cost.

SUMMARY OF THE INVENTION

One of the objects of the invention is to provide a baby walker speed control caster including an axle piece, a pair of wheels symmetrically provided at either side of the axle piece, and a ball. The axle piece is provided with a pivot hole, a through hole, and a pivot shaft. Each wheel is formed in a thickness radially increasing respectively from the adjacency of the wheel center and is provided with a pivot hole a t the center and a plurality of embossing curves at the inner side; in this way, the wheels are pivotably connected to each other by a pivot axle passing through the pivot holes of the wheels and the axle piece sandwiched between the wheels such that a chamber, containing the ball, is formed by the through hole of the axle piece and the inner walls of the wheels and the width between two inner walls decreases radially from the adjacency of the wheel center. By this structure, a baby walker is effectively braked while in high speed, and the embossing curves leading the ball upward along the elongation of the chamber can hardly diminish the agility of the speed control caster. Besides, the wheels of the speed control caster are also advantaged for the low cost and simple design with a persistent thickness of the wheel, thus maintaining a constant braking effect.

BRIEF DESCRIPTION OF THE DRAWINGS

These and other objects and advantages of the present invention will become apparent by referring to the following description and accompanying drawings wherein.

DETAIL DESCRIPTION OF THE INVENTION

Figure 1:
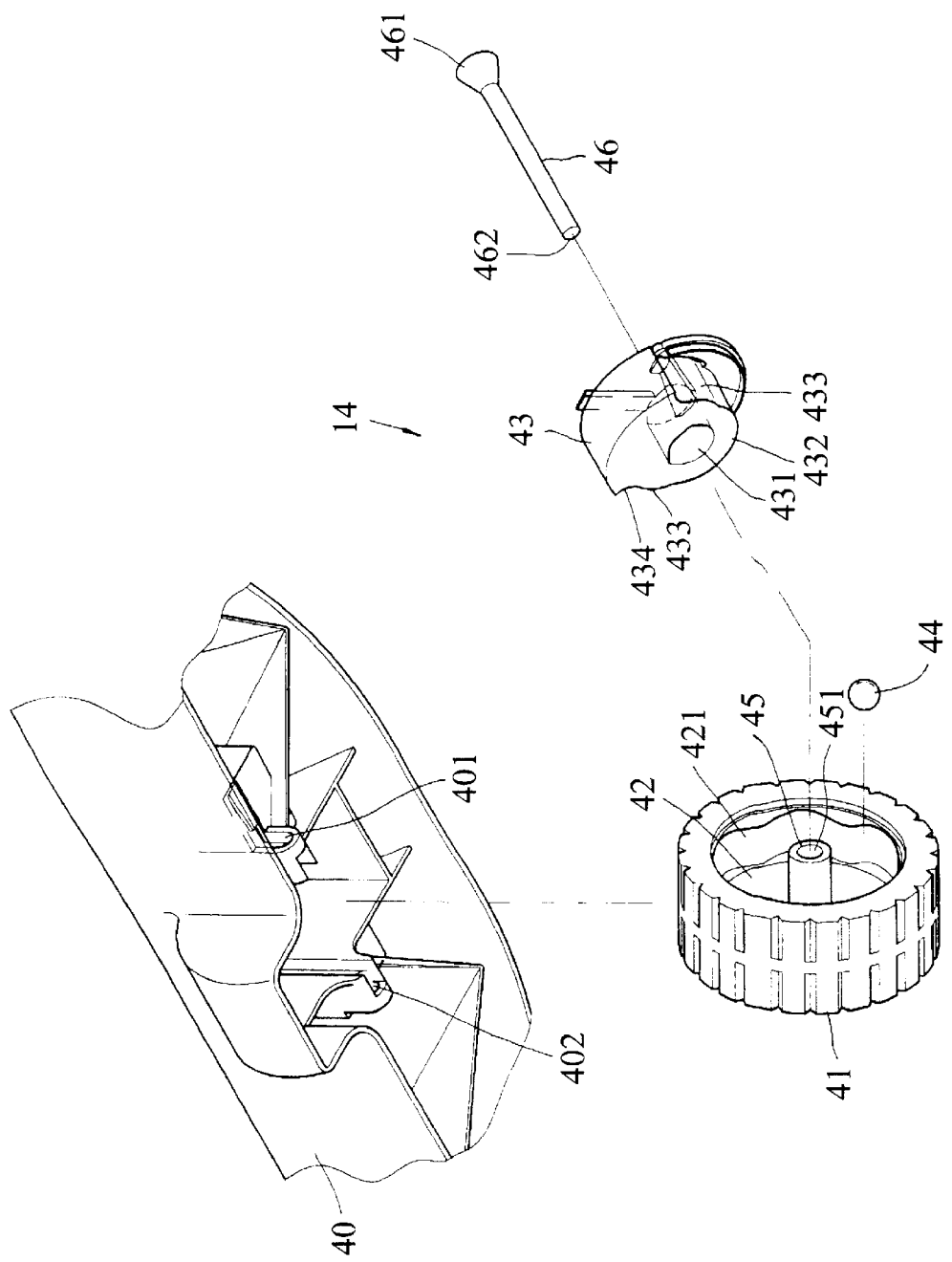
FIG. 1 is an exploded view of a conventional speed control caster mounted at a wheel seat.
Figure 2:
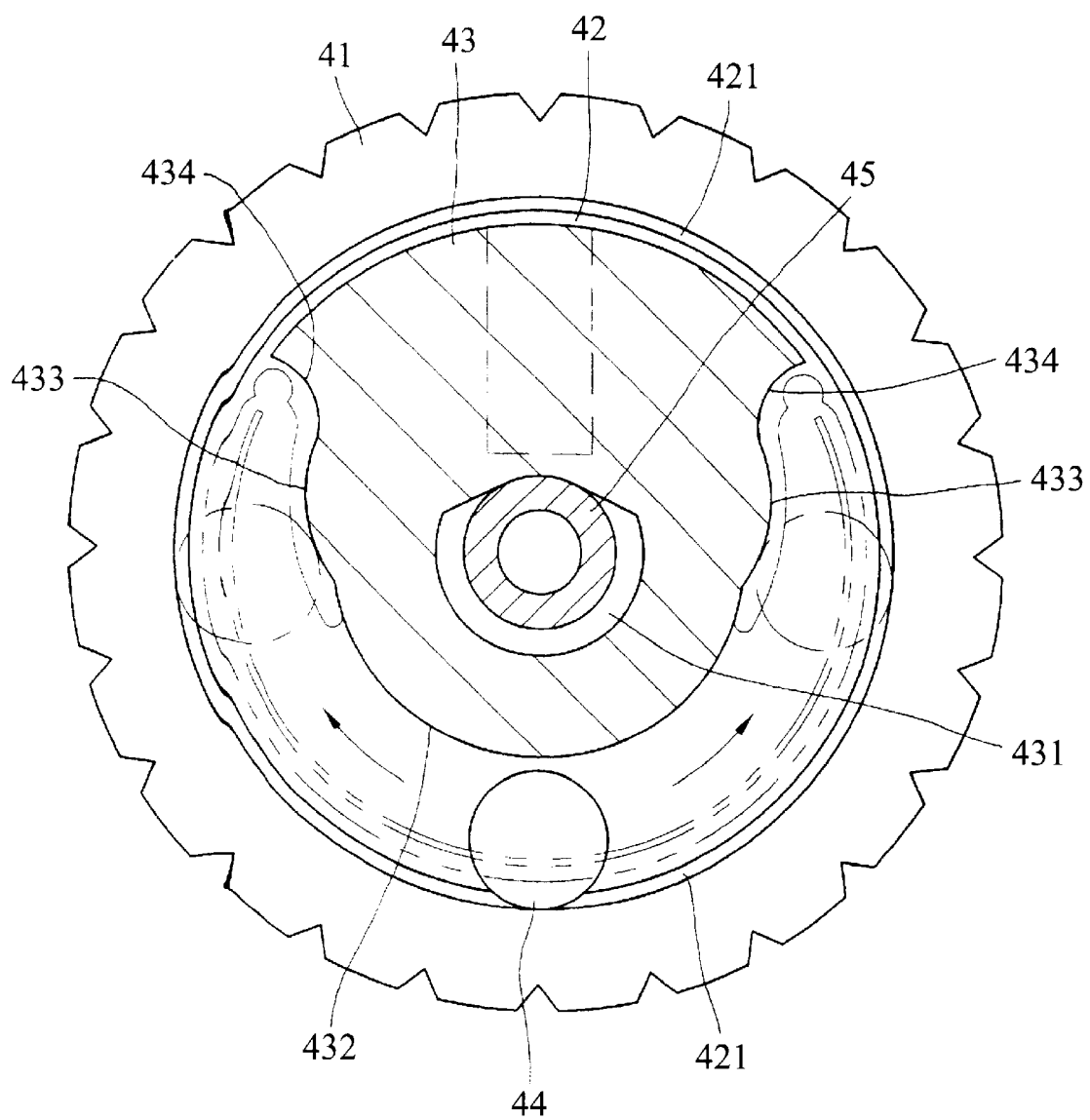
FIG. 2 is a schematic view illustrating the fixing piece 43 put into the wheel 41 of FIG. 1.
Figure 3A:
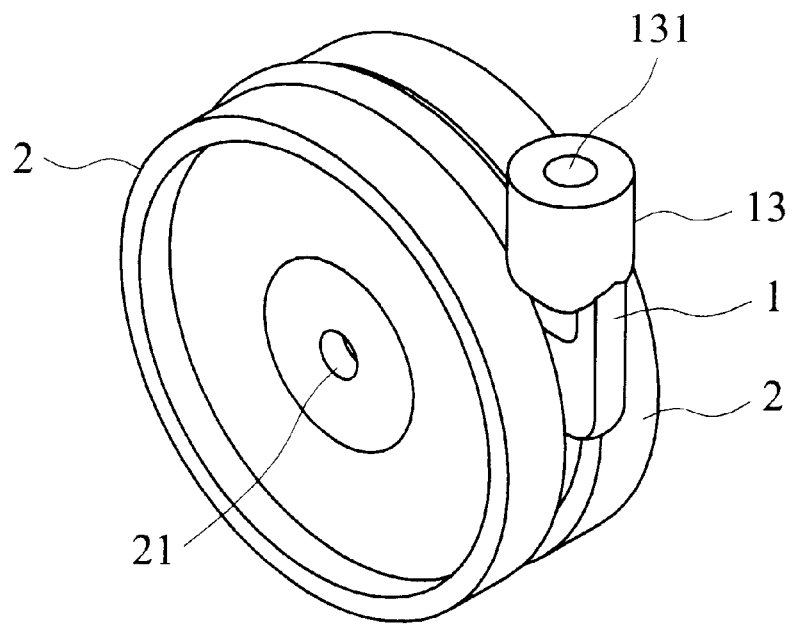
FIG. 3A is a pictorial view of the first embodiment of the invention.
Figure 3B:
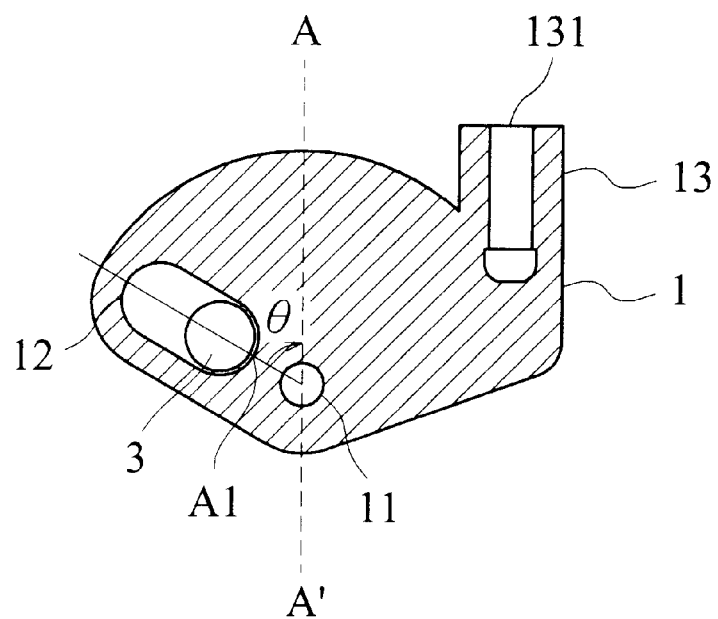
FIG. 3B is a schematic view of the axle piece of FIG. 3A.
Figure 4:
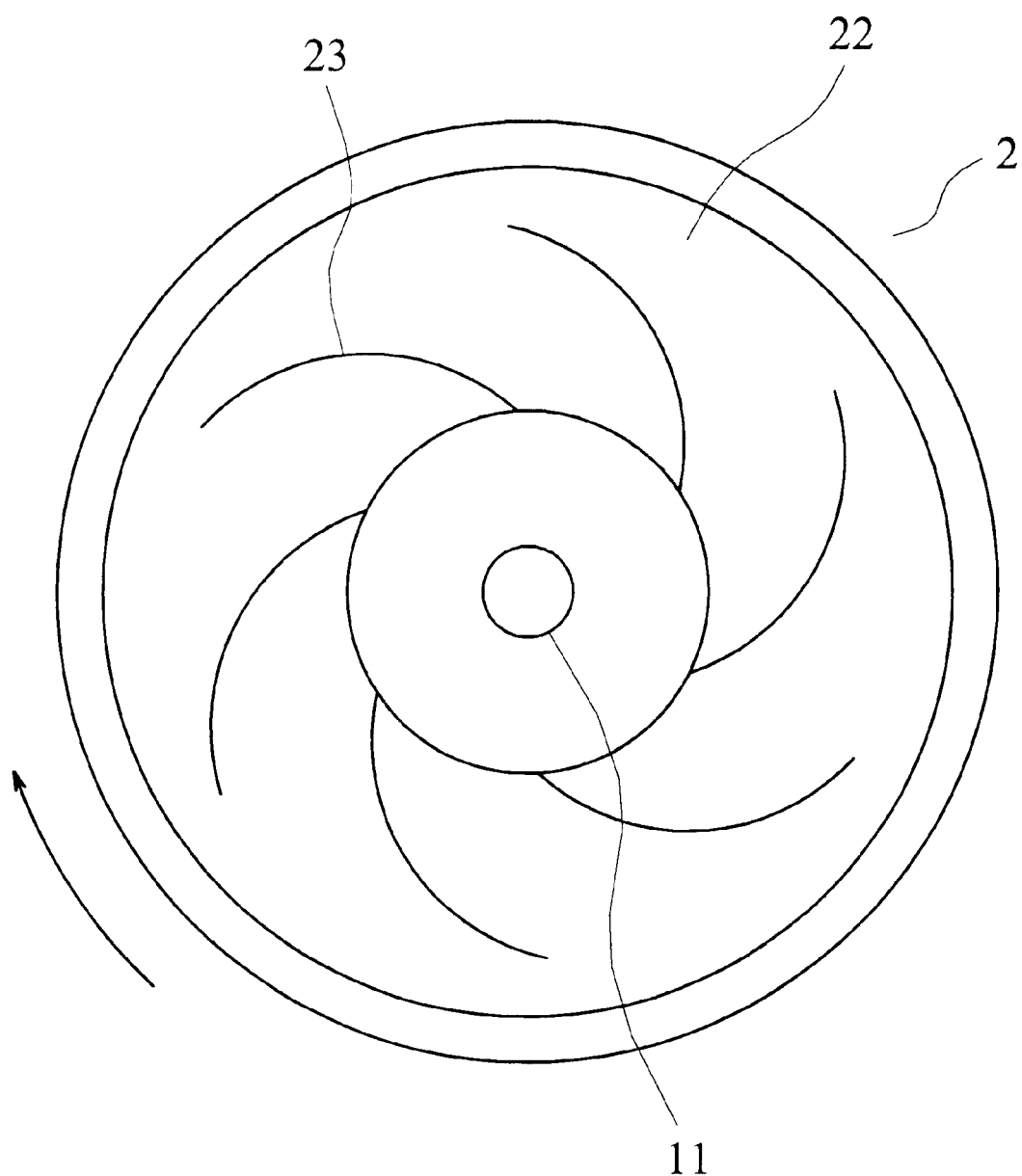
FIG. 4 is a schematic view of the embossing curves in the inner wheel according to the first embodiment of the invention.

Referring to FIGS. 3A and 3B, the baby walker speed control caster according to the first embodiment of the invention includes a ball 3, a pair of wheels 2 formed with a plurality of spiral-shaped embossing curves 23 as shown in FIG. 4, and an axle piece 1 provided with a pivot hole 11, a through hole 12, and a pivot shaft 13.

The through hole 12 with the ball 3 in it is formed in an elongated elliptical shape whose long axis is at an angle θ to the vertical line AA' shown in FIG. 3B. Basically, the through hole 12 can be formed in an arbitrary shape as long as the ball 3 has enough space to move back and forth in it and the elongation of the through hole 12 is at an angle θ to the vertical line AA'. The appropriate angle θ is between 0 to 90 degrees.

Figure 5A:
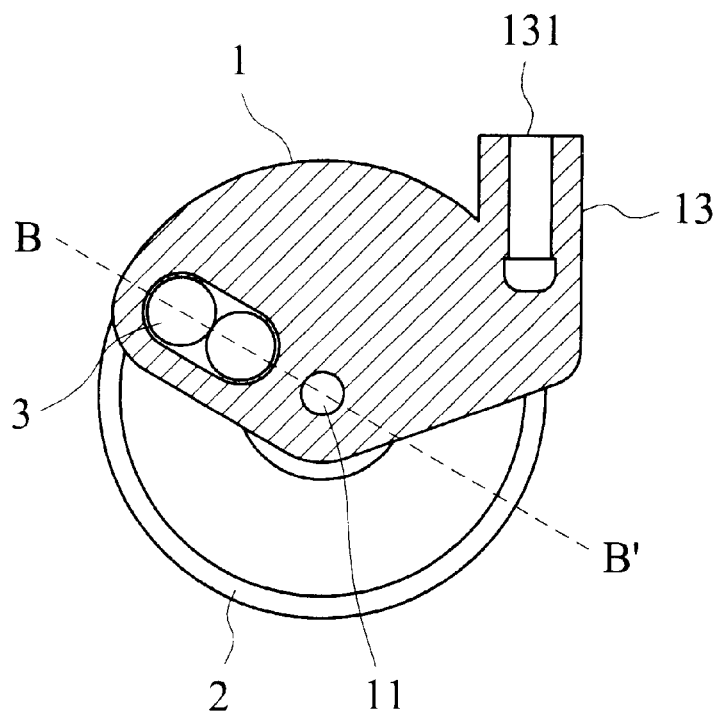
FIG. 5A is a cross-sectional view illustrating the combination of the axle piece, the wheels, and the ball according to the first embodiment of the invention.
Figure 5B:
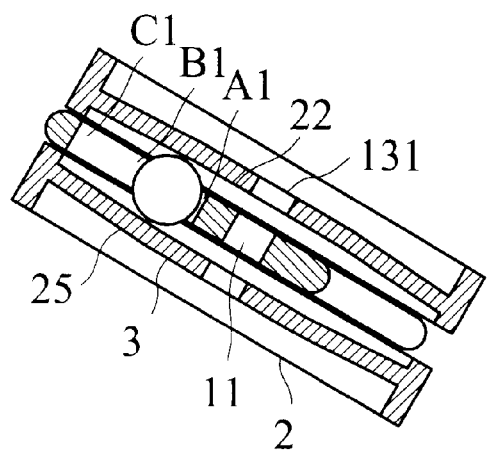
FIG. 5B is a cross-sectional view taken along the BB' line in FIG. 5A.

As shown in FIGS. 5A and 5B, the axle piece 1 is sandwiched between both the wheels 2 such that a prolonged chamber 25 containing the ball 3 is formed by the through hole 12 and the inner walls of the wheels 2. Starting from the point A1 in the vicinity of the wheel center, the width between two inner walls 22 of the wheels 2 is preferably decreased radially such that the faster the width decreases radially, the more remarkably the brake effect is behaved.

Referring to FIGS. 3A and 3B, the pivot shaft 13 is provided at one side of the vertical line AA' and pivotably mounted at a base frame (not shown) by the pivot hole 131; the wheels 2 are pivotably connected to each other by a pivot axle (not shown) passing through the pivot holes 11 and 21 such that both wheels 2 simultaneously pivot on the pivot hole 11 by the pivot axle. Once the baby walker moves, the wheels 2 are swiveled about the pivot shaft 13 such that the wheel center is always behind the pivot shaft 13 as the baby walker is in motion.

Thus, the embossing curves 23 are always revolved in the clockwise direction as indicated in FIG. 4. When the embossing curves 23 revolve as the speed control caster in a relatively high speed, the ball 3 is swept upward by the turning embossing curves 23. The faster the baby walker goes, the closer the ball 3 gets to the far side B1 of the through hole 12 such that frictional force caused between the axle piece 1 and the wheels 2 via the ball 3 also increases since the ball 3 is squeezed between two inner walls of the wheels 2. When the speed of the baby walker gets slow, the ball 3 will slide toward the wheel center or the point A1 by gravity such that the frictional force between the axle piece 1 and the wheels 2 will diminish or vanish, that is, the baby walker can move with ease while in low speed.

Moreover, the through hole 12 can be formed with a rough inner surface to strengthen the frictional force between the ball 3 and the through hole 12 for a larger brake effect. A larger value of the angle θ also results in a more effective braking process since the gravitational force pulling back the ball 3 becomes weaker for the larger θ. Another method to strengthen the brake effect is to increase the number of the spiral embossing curves 23 because more embossing curves 23 can increase the frequency by which the ball 3 is swept up toward the far side B1 of the through hole 12, thus increasing the frictional force between the axle piece 1 and the wheels 2. The aforementioned spiral shape of the embossing curves 23 can be replaced by other shapes resulting in the similar effect of the spiral one as long as the ball 3 can be effectively swept upward when the wheels 2 are turning.

While this invention has been described with reference to an illustrative embodiment, it is not intended that this description is construed in a limiting sense. Various modifications and combinations of the illustrative embodiment, as well as other embodiments of the invention, will be apparent to persons skilled in the art upon reference to the description. It is therefore intended that the appended claims encompass any such modifications or embodiments.

What is claimed is:

1. A baby walker speed control caster comprising:

an axle piece having a pivot hole, a through hole elongated at an angle to a vertical line passing the center of said pivot hole, and a pivot shaft provided at one side of said vertical line for one end and pivotably mounted at a base frame of said baby walker for the other end;

a pair of wheels being symmetrically provided at either side of said axle piece and having a thickness radially increasing respectively from the adjacency of the wheel center, each of said wheels having a pivot hole at the center and a plurality of embossing curves at the inner side, wherein said wheels are pivotably connected to each other by a pivot axle passing through the pivot holes of said wheels and the pivot hole of said axle piece sandwiched between said wheels such that a chamber is formed by the through hole of said axle piece and the inner walls of said wheels and the width between said two inner walls decreases radially from the adjacency of the wheel center.

a ball being provided in the through hole of said axle piece and moving back and forth along the elongation of said through hole.

2. A baby walker speed control caster as claimed in claim 1, wherein the through hole of said axle piece is elongated at an angle between 0 and 90 degrees to said vertical line.

3. A baby walker speed control caster as claimed in claim 1, wherein the through hole of said axle piece is formed with a rough inner surface.

4. A baby walker speed control caster as claimed in claim 1, wherein each of said embossing curves is formed in a spiral shape.

* * * * *